(12) United States Patent
Kondoh

(10) Patent No.: US 6,757,080 B1
(45) Date of Patent: Jun. 29, 2004

(54) IMAGE PROCESSING SYSTEM

(75) Inventor: Tuyoshi Kondoh, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 875 days.

(21) Appl. No.: 09/644,796

(22) Filed: Aug. 24, 2000

(30) Foreign Application Priority Data

Aug. 26, 1999 (JP) .......................................... 11-239328

(51) Int. Cl.⁷ .............................................. H04N 1/40
(52) U.S. Cl. ..................... 358/3.22; 358/3.23; 382/296; 382/297
(58) Field of Search ................................. 358/1.9, 3.06, 358/3.13, 3.14, 3.21, 3.22, 3.23, 3.24, 534, 535, 536; 382/270, 274, 293, 296, 297

(56) References Cited

U.S. PATENT DOCUMENTS

| | | | | |
|---|---|---|---|---|
| 4,636,783 A | * | 1/1987 | Omachi | 345/658 |
| 5,365,601 A | * | 11/1994 | Kadakia et al. | 382/297 |
| 5,973,721 A | * | 10/1999 | Bergmans et al. | 347/262 |
| 6,307,966 B1 | * | 10/2001 | Chapin | 382/232 |
| 6,310,986 B2 | * | 10/2001 | Robey et al. | 382/296 |

* cited by examiner

Primary Examiner—Thomas D. Lee
(74) Attorney, Agent, or Firm—Stevens, Davis, Miller & Mosher, LLP.

(57) ABSTRACT

An image processing system which includes: a threshold table selecting unit for selecting one of a plurality of threshold reference tables in accordance with an angle of rotation for bit map data having an attribute of rotation to thereby generate a threshold; a gradation modulating unit for performing gradation modulation by use of the threshold generated by the threshold table selecting unit to thereby obtain gradation-modulated data; a buffer unit having a plurality of buffers and for storing the gradation-modulated data of the gradation modulating unit into the plurality of buffers; an addressing unit for designating respective storage addresses for the plurality of buffers of the buffer unit; a rotating unit for rotating the gradation-modulated data; and a storage unit for storing contents of the buffer unit into the addresses designated by the addressing unit and outputting the gradation-modulated data rotated by the rotating unit.

10 Claims, 11 Drawing Sheets

FIG. 3

| | | | | |
|---|---|---|---|---|
| 70 × 68 | 0 × 78 | | 70 × 98 | 0 × 88 |
| 60 × 48 | 0 × 58 | | 60 × 18 | 0 × 08 |
| 50 × A8 | 0 × B8 | | 50 × B8 | 0 × A8 |
| 40 × 88 | 0 × 98 | | 40 × 38 | 0 × 28 |
| 30 × E8 | 0 × F8 | | 30 × 58 | 0 × 48 |
| 20 × C8 | 0 × D8 | | 20 × D8 | 0 × C8 |
| 10 × 28 | 0 × 38 | | 10 × 78 | 0 × 68 |
| 00 × 08 | 0 × 18 | | 00 × F8 | 0 × E8 |

TABLE 3i (0° ROTATION)　　　TABLE 3j (90° ROTATION)

| | | | | |
|---|---|---|---|---|
| 70 × 18 | 0 × 08 | | 70 × E8 | 0 × F8 |
| 60 × 38 | 0 × 28 | | 60 × 68 | 0 × 78 |
| 50 × D8 | 0 × C8 | | 50 × C8 | 0 × D8 |
| 40 × F8 | 0 × E8 | | 40 × 48 | 0 × 58 |
| 30 × 98 | 0 × 88 | | 30 × 28 | 0 × 38 |
| 20 × B8 | 0 × A8 | | 20 × A8 | 0 × B8 |
| 10 × 58 | 0 × 48 | | 10 × 08 | 0 × 18 |
| 00 × 78 | 0 × 68 | | 00 × 88 | 0 × 98 |

TABLE 3k (180° ROTATION)　　　TABLE 3m (270° ROTATION)

```
70 × 68   0 × 78
60 × 48   0 × 58
50 × A8   0 × B8
40 × 88   0 × 98
30 × E8   0 × F8
20 × C8   0 × D8
10 × 28   0 × 38
00 × 08   0 × 18
```
TABLE

IMAGE PROCESSING SYSTEM

BACKGROUND OF THE INVENTION

The present invention relates to an image processing system for performing gradation modulation and rotation of bit map data having the attribute of rotation.

The quantity of data in an image used in a printer has increased with the advance of coloration, resolution and gradation in recent years. On the other hand, print data have been often requested to be rotated in accordance with the needs for printing two pages on opposite sides of one sheet of paper, printing a plurality of pages on one sheet of paper, etc. Hence, the demand for increase of the speed of rotation on such a large quantity of data has become greater.

A background-art image processing system for performing gradation modulation and rotation of bit map data having the attribute of rotation will be described with reference to FIG. 13.

As shown in FIG. 13, a background-art rotating system 10 generated a bit map rotated modulated output in accordance with a request given from a CPU through the steps of: once storing a bit map data input in a storage memory 13; rotating the data by rotating means 11 before gradation modulation; writing the rotated data back into the storage memory 13; modulating the gradation of the data by gradation modulating means 12; and writing the modulated data back into the storage memory 13.

A large capacity of memory was, however, required for the background-art gradation modulation and rotation of bit map data having the attribute of rotation because the data was rotated before gradation modulation. Hence, increase of the processing time was brought about.

SUMMARY OF THE INVENTION

Therefore, an object of the present invention is to provide an image processing system which can perform gradation modulation and rotation of bit map data at a high speed in spite of a small memory capacity.

In order to achieve the above object, according to an aspect of the present invention, an image processing system is configured to have: threshold table selecting means for selecting one of a plurality of threshold reference tables in accordance with an angle of rotation for bit map data having an attribute of rotation to thereby generate a threshold; gradation modulating means for performing gradation modulation by use of the threshold generated by the threshold table selecting means to thereby obtain gradation-modulated data; buffer means having a plurality of buffers and for storing the gradation-modulated data of the gradation modulating means into the plurality of buffers; addressing means for designating respective storage addresses for the plurality of buffers of the buffer means; rotating means for rotating the gradation-modulated data; and storage means for storing contents of the buffer means into the addresses designated by the addressing means and outputting the gradation-modulated data rotated by the rotating means.

Owing to the above configuration, the gradation modulation and rotation of bit map data can be performed at a high speed in spite of a small memory capacity.

Further, according to another aspect of the present invention, an image processing system is configured to have: threshold generating means for generating a threshold while controlling generation of a threshold reference table address in accordance with an angle of rotation for bit map data having an attribute of rotation; gradation modulating means for performing gradation modulation by use of the threshold generated by the threshold generating means to thereby obtain gradation-modulated data; buffer means having a plurality of buffers and for storing the gradation-modulated data obtained by the gradation modulating means into the plurality of buffers; addressing means for designating respective storage addresses for the plurality of buffers of the buffer means; rotating means for rotating the gradation-modulated data; and storage means for storing contents of the buffer means into the addresses designated by the addressing means and outputting the gradation-modulated data rotated by the rotating means.

Owing to the above configuration, the gradation modulation and rotation of bit map data can be performed at a high speed in spite of a small memory capacity.

The present invention provides an image processing system having: threshold table selecting means for selecting one of a plurality of threshold reference tables in accordance with an angle of rotation for bit map data having an attribute of rotation to thereby generate a threshold; gradation modulating means for performing gradation modulation by use of the threshold generated by the threshold table selecting means to thereby obtain gradation-modulated data; buffer means having a plurality of buffers and for storing the gradation-modulated data of the gradation modulating means into the plurality of buffers; addressing means for designating respective storage addresses for the plurality of buffers of the buffer means; rotating means for rotating the gradation-modulated data; and storage means for storing contents of the buffer means into the addresses designated by the addressing means and outputting the gradation-modulated data rotated by the rotating means. Accordingly, the apparatus has a function and operation that the gradation modulation and rotation of bit map data can be performed at a high speed in spite of a small memory capacity.

Further, the present invention provides an image processing system having: threshold generating means for generating a threshold while controlling generation of a threshold reference table address in accordance with an angle of rotation for bit map data having an attribute of rotation; gradation modulating means for performing gradation modulation by use of the threshold generated by the threshold generating means to thereby obtain gradation-modulated data; buffer means having a plurality of buffers and for storing the gradation-modulated data obtained by the gradation modulating means into the plurality of buffers; addressing means for designating respective storage addresses for the plurality of buffers of the buffer means; rotating means for rotating the gradation-modulated data; and storage means for storing contents of the buffer means into the addresses designated by the addressing means and outputting the gradation-modulated data rotated by the rotating means. Accordingly, the apparatus has a function and operation that the gradation modulation and rotation of bit map data can be performed at a high speed in spite of a small memory capacity.

BRIEF DESCRIPTION OF THE DRAWINGS

FIG. 3 is an explanatory view showing table data in the threshold table selecting means depicted in FIG. 2;

DESCRIPTION OF THE EMBODIMENTS

Figure 1:
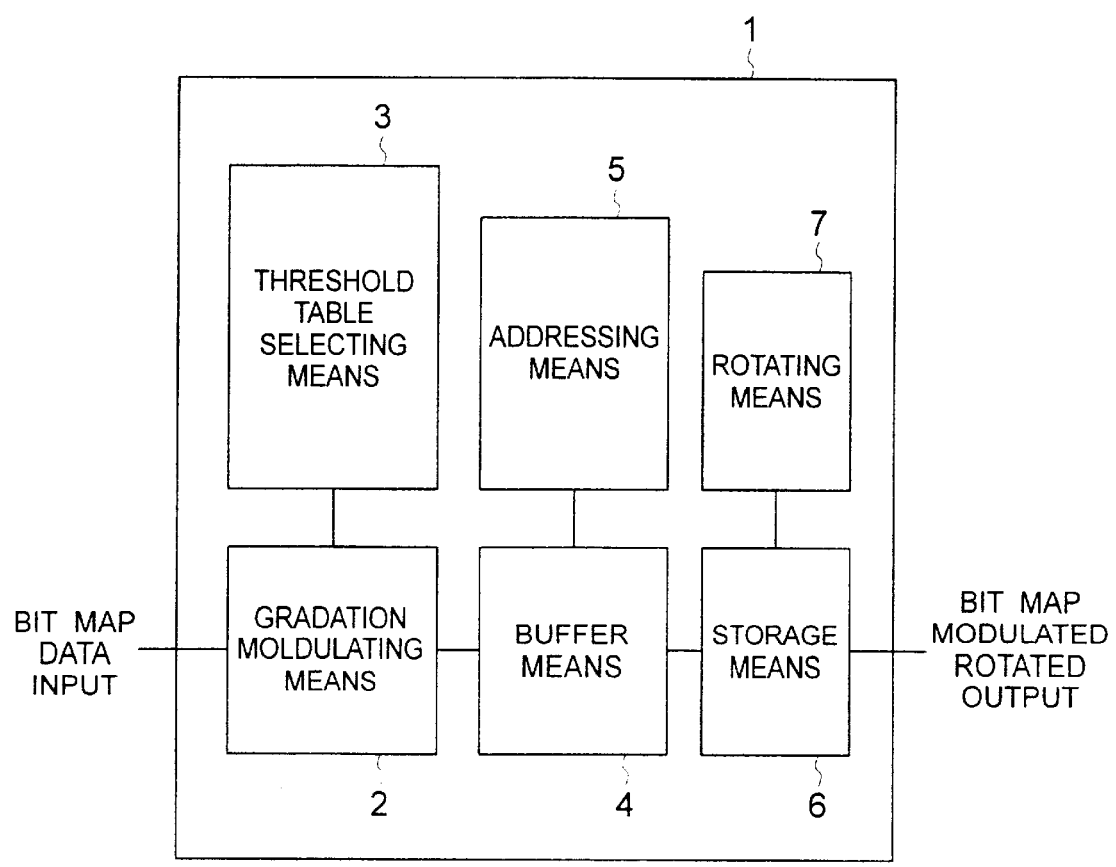
FIG. 1 is a block diagram showing an image processing system according to Embodiment 1 of the present invention.

Embodiments of the present invention will be described below with reference to FIGS. 1 through 12. In the drawings, like parts are correspondingly referenced for avoiding duplication of description.

Embodiment 1

Figure 2:
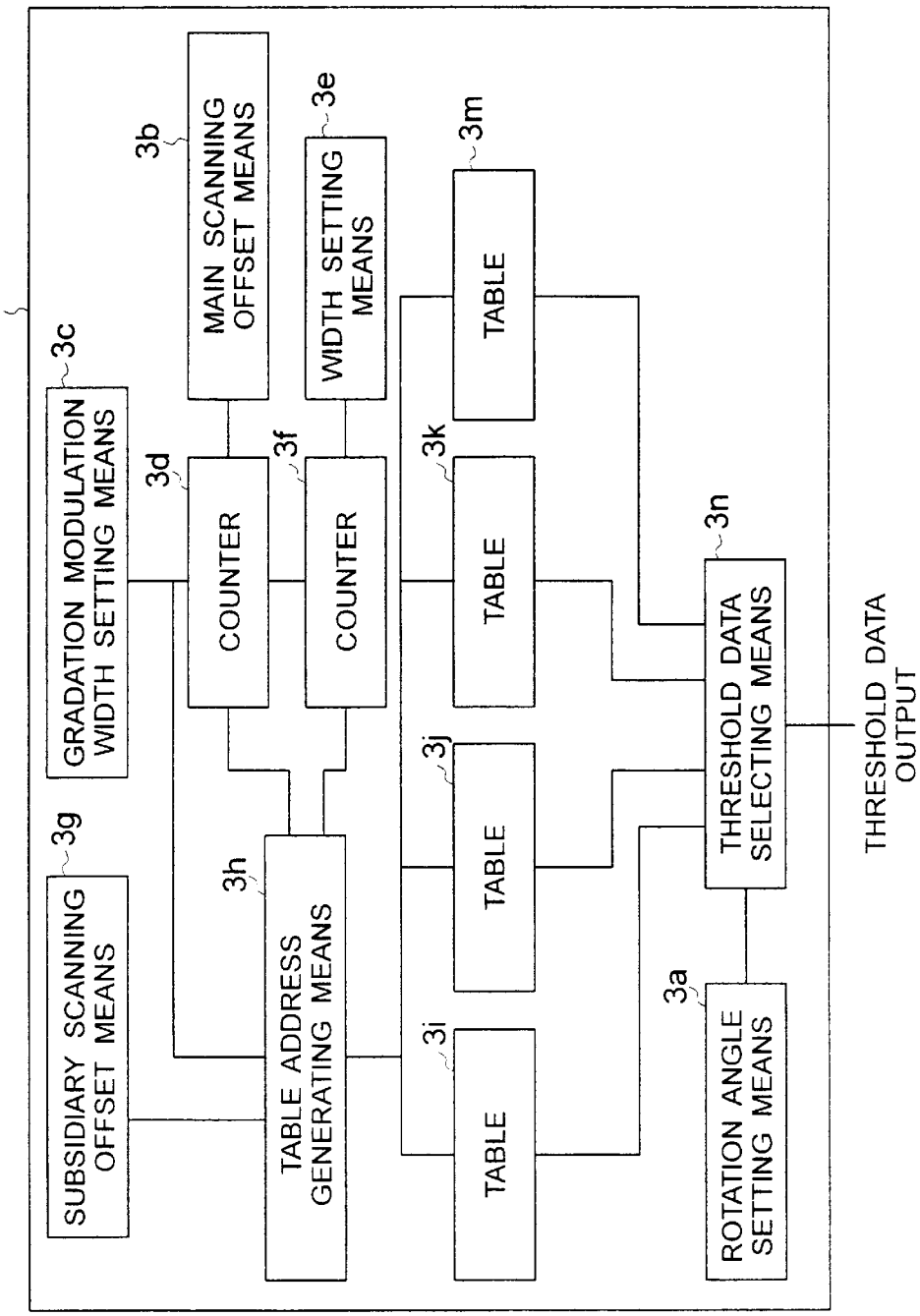
FIG. 2 is a block diagram showing threshold table selecting means in the image processing system depicted in FIG. 1.
Figure 4:
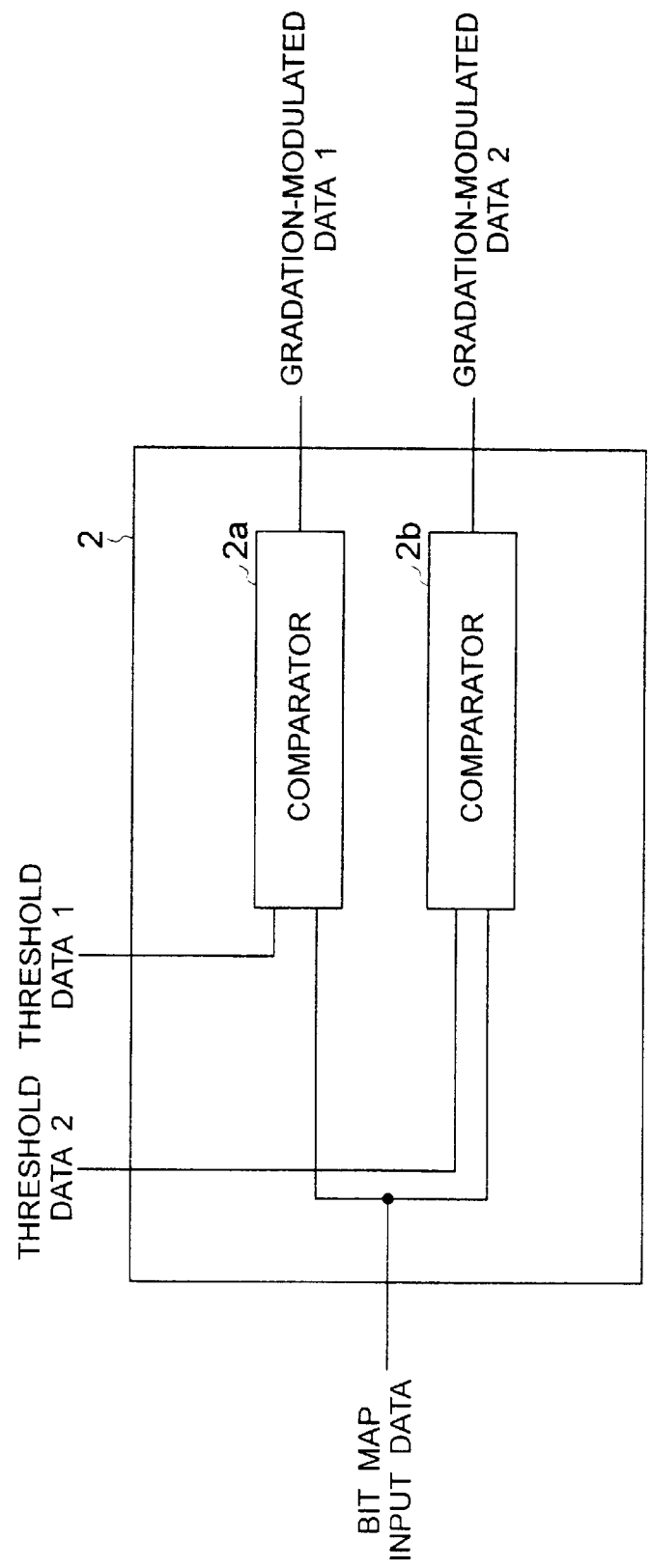
FIG. 4 is a block diagram showing gradation modulating means in the image processing system depicted in FIG. 1.
Figure 5:
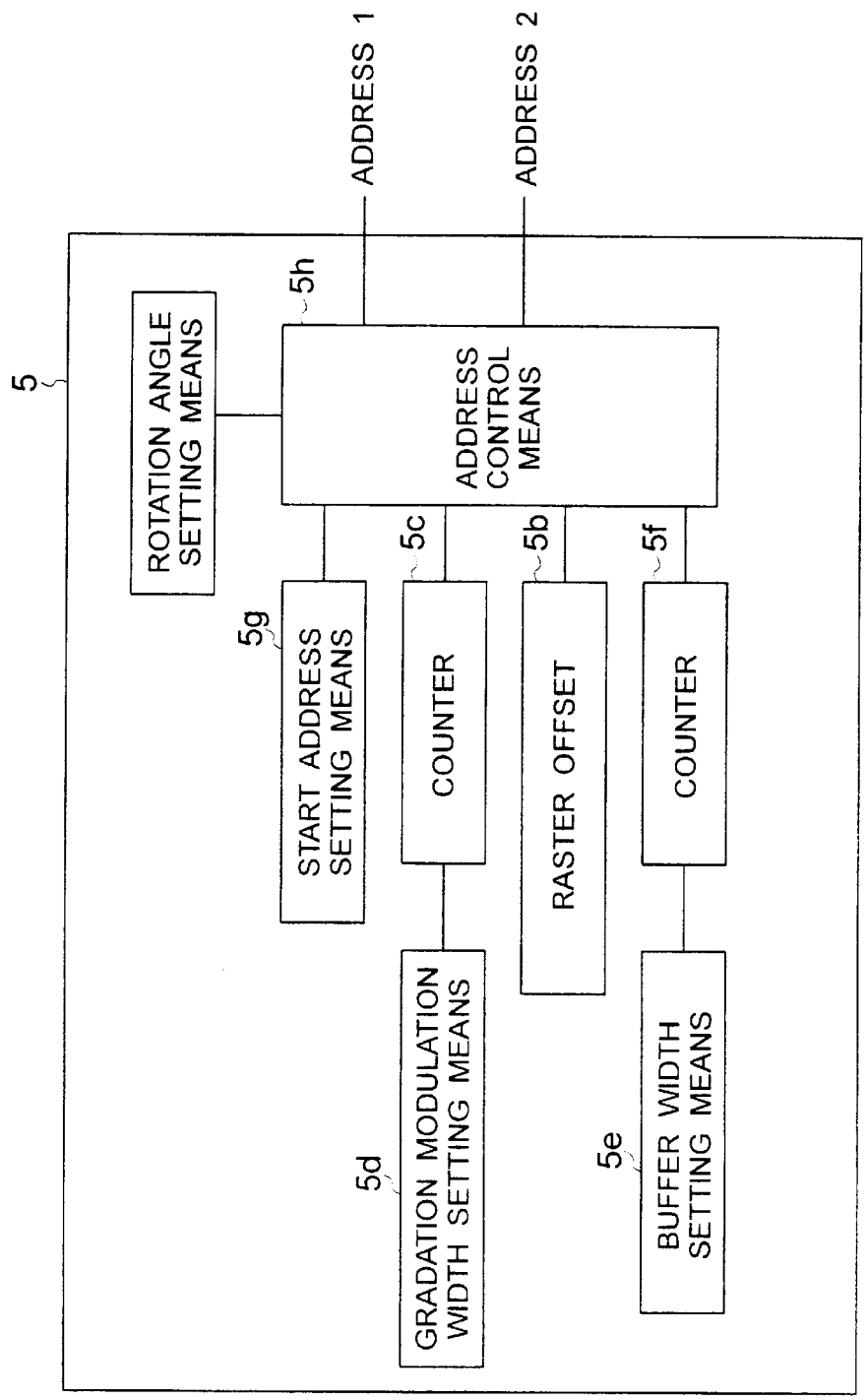
FIG. 5 is a block diagram showing addressing means in the image processing system depicted in FIG. 1.
Figure 6:
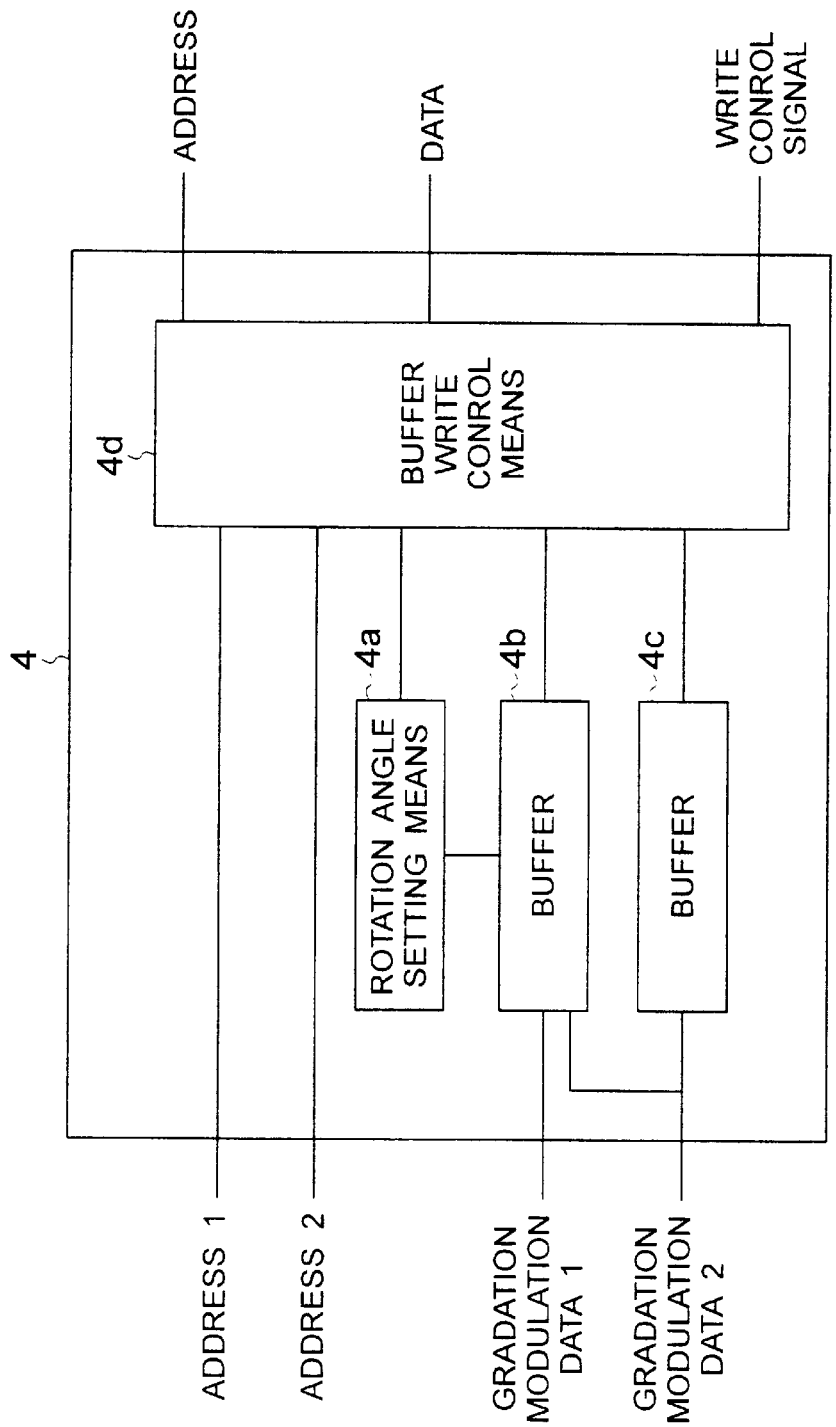
FIG. 6 is a block diagram showing buffer means in the image processing system depicted in FIG. 1.
Figure 7:
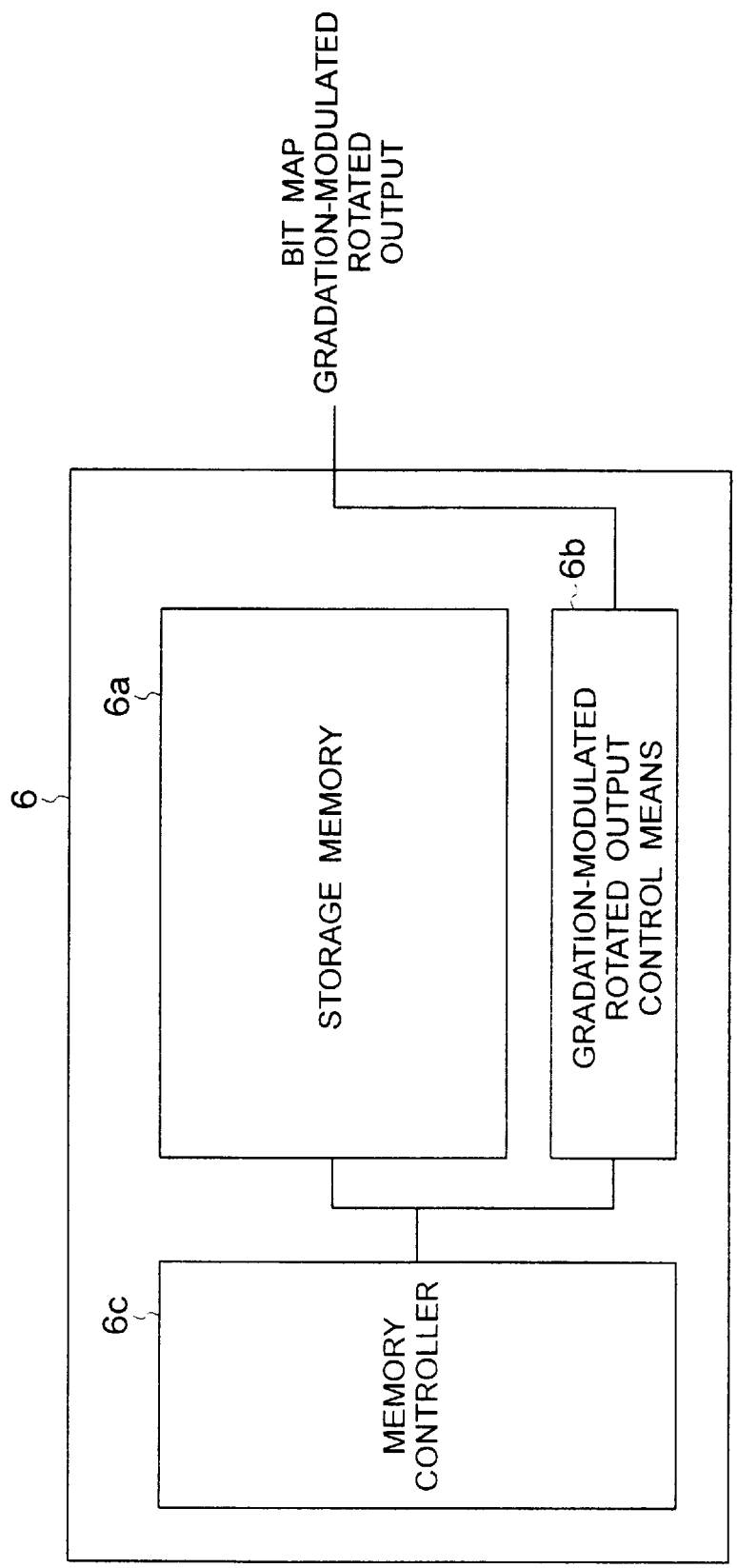
FIG. 7 is a block diagram showing storage means in the image processing system depicted in FIG. 1.
Figure 8:
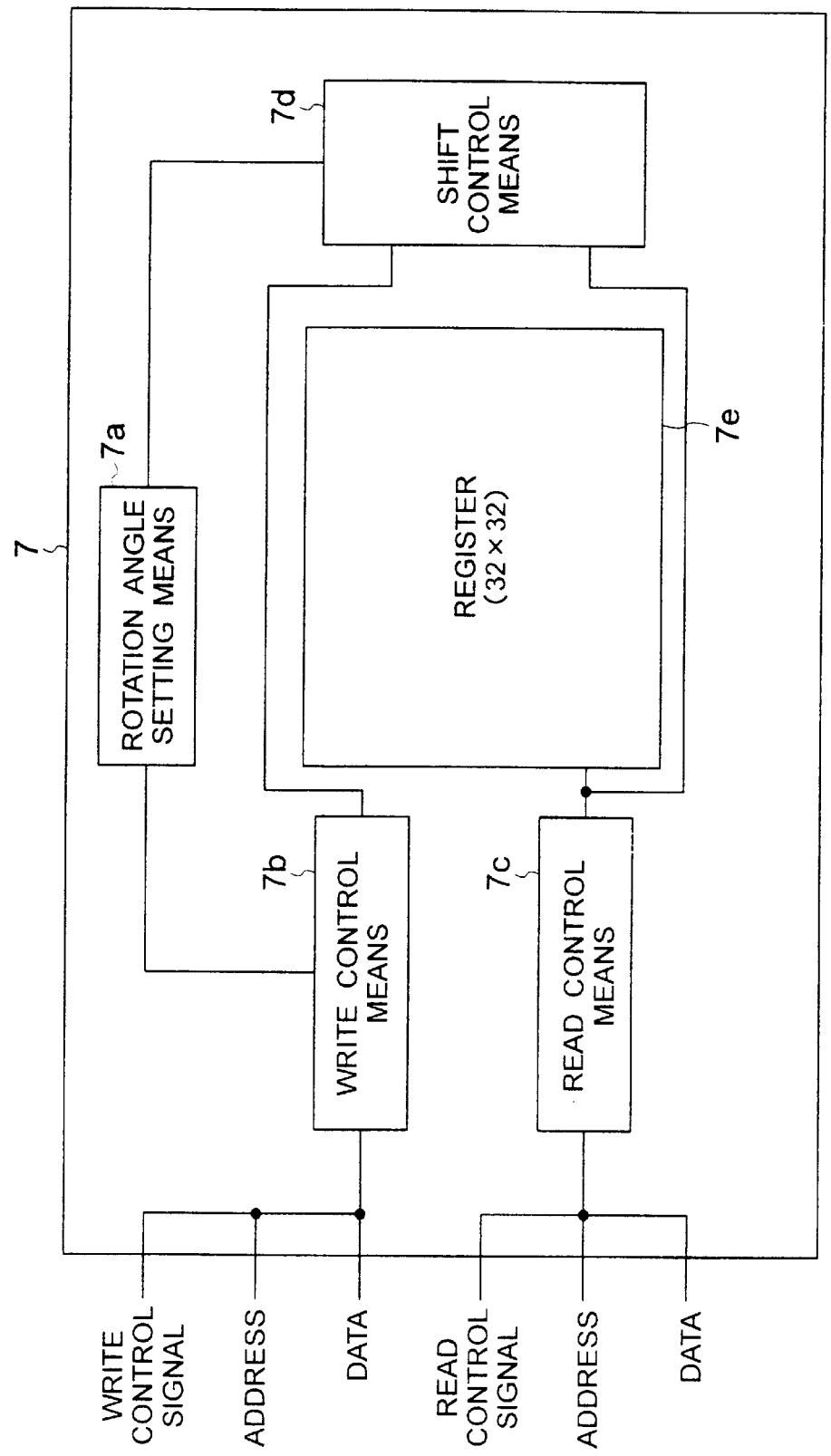
FIG. 8 is a block diagram showing rotating means in the image processing system depicted in FIG. 1.
Figure 9:
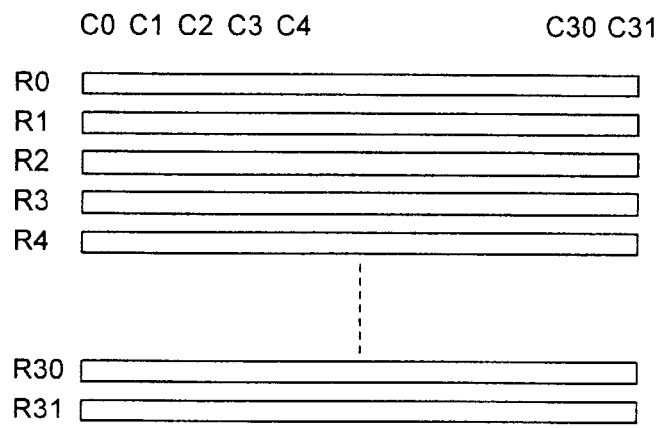
FIG. 9 is an explanatory view showing a register in the rotating means depicted in FIG. 8.

FIG. 1 is a block diagram which shows an image processing system according to Embodiment 1 of the present invention; FIG. 2 is a block diagram which shows threshold table selecting means in the image processing system depicted in FIG. 1; FIG. 3 is an explanatory view which shows table data in the threshold table selecting means depicted in FIG. 2; FIG. 4 is a block diagram which shows gradation modulating means in the image processing system depicted in FIG. 1; FIG. 5 is a block diagram which shows addressing means in the image processing system depicted in FIG. 1; FIG. 6 is a block diagram which shows buffer means in the image processing system depicted in FIG. 1; FIG. 7 is a block diagram which shows storage means in the image processing system depicted in FIG. 1; FIG. 8 is a block diagram which shows rotating means in the image processing system depicted in FIG. 1; and FIG. 9 is an explanatory view which shows a register in the rotating means depicted in FIG. 8.

As shown in FIG. 1, the image processing system 1 according to Embodiment 1 is provided with: threshold table selecting means 3 for selecting one of a plurality of threshold reference tables in accordance with the angle of rotation for bit map data having the attribute of rotation to thereby generate a threshold; gradation modulating means 3 for performing gradation modulation by use of the threshold generated by the threshold table selecting means 3 to thereby obtain gradation-modulated data; buffer means 4 for storing the data gradation-modulated by the gradation modulating means 2 into a plurality of buffers; addressing means 5 for designating storage addresses for the plurality of buffers, respectively, in the buffer means 4; rotating means 7 for performing rotation of the gradation-modulated data; and storage means 6 for storing the contents of the buffer means 4 into the addresses designated by the addressing means 5 and, at the same time, outputting the gradation-modulated data rotated by the rotating means 7.

According to such an image processing system 1, two-valued gradation-modulated data is obtained in the gradation modulating means 2 by use of the threshold generated by the threshold table selecting means 3 and bit map data. The gradation-modulated data is stored in the buffer means 4. The contents of the buffers of the buffer means 4 are stored in the storage means 6 by use of the addresses generated by the addressing means 5. The gradation-modulated data stored in the storage means 6 is rotated by the rotating means 6 and then stored in the storage means 6 again. The data is taken out as a bit map gradation-modulated rotated output as occasion demands.

The threshold table selecting means 3 will be described below with reference to FIG. 2.

The threshold table selecting means 3 is constituted by: rotation angle setting means 3$a$ for setting, by a CPU, four kinds of rotation angles 0°, 90°, 180° and 270° clockwise; main scanning offset means 3$b$; gradation modulation width setting means 3$c$ for setting, by the CPU, the width in the direction of main scanning of gradation modulation tables; a counter 3$d$ for loading the main scanning offset means 3$b$ so that the initial value of the counter 3$d$ is incremented by one whenever one pixel of the data input is processed, and for reloading the main scanning offset means 3$b$ when the value of the counter 3$d$ coincides with the value of the gradation modulation width setting means 3$c$; width setting means 3$e$ for setting, by the CPU, the image width of an input image; a counter 3$f$ which has the initial value "0" to be incremented by one whenever one pixel of the data input is processed, and which is reset to "0" while generating a width coincidence signal when the value of the counter 3$f$ coincides with the value of the width setting means 3$e$; subsidiary scanning offset means 3$g$ for setting, by the CPU, the offset value in the direction of subsidiary scanning of the gradation modulation tables; table address generating means 3$h$ for generating a table address; tables 3$i$, 3$j$, 3$k$ and 3$m$ supplied with the table address generated by the table address generating means 3$h$; and threshold data selecting means 3$n$ for selecting threshold data from the tables 3$i$, 3$j$, 3$k$ and 3$m$ in accordance with the contents of the rotation angle setting means 3$a$ to thereby output predetermined threshold data.

When Soff, Dw and Cnt1 are the value of the subsidiary scanning offset means 3$g$, the value of the gradation modulation width setting means 3$c$ and the value of the counter 3$d$ respectively, the table address Dadrs generated by the table address generating means 3$h$ is given by the expression (1):

$$D\text{adrs}=D\text{base}+C\text{nt1} \tag{1}$$

in which Dbase is a value set initially as follows:

$$D\text{base}=S\text{off} \times D\text{w} \tag{2}$$

and updated on the basis of reception of the width coincidence signal as follows:

$$D\text{base}=D\text{base}+D\text{w} \tag{3}$$

The table 3$i$ is a gradation modulation table for clockwise 0° rotation. The table 3$j$ is a gradation modulation table for clockwise 90° rotation. The table 3$k$ is a gradation modulation table for clockwise 180° rotation. The table 3$m$ is a gradation modulation table for clockwise 270° rotation.

The respective threshold tables in the threshold data selecting means 3$n$ are configured as shown in FIG. 3. In FIG. 3, the first column expresses addresses and the second and third columns express table data. The second column of data is threshold data 1. The third column of data is threshold data 2.

Next, the gradation modulating means 2 will be described below with reference to FIG. 4.

The gradation modulating means 2 is constituted by comparators 2a and 2b for comparing bit map input data with threshold data 1 and 2 respectively. The threshold data 1 and 2 are threshold data selected by the threshold table selecting means 3. The gradation modulating means 2 outputs gradation-modulated data 1 and 2 on the basis of the results of comparison of the comparators 2a and 2b respectively. The gradation-modulated data 1 and 2 are two-valued gradation-modulated data. Incidentally, each of the gradation-modulated data 1 and 2 takes "1" for Vb>Th and "0" for Vb≦h when Vb is the value of the bit map input data and Th is the value of the corresponding threshold data.

Next, the addressing means 5 will be described with reference to FIG. 5.

The addressing means 5 is constituted by: rotation angle setting means 5a for setting, by the CPU, four kinds of rotation angles 0°, 90°, 180° and 270° clockwise; a raster offset 5b for setting the address offset for gradation-modulated output data corresponding to the pixel width of bit map input data; gradation modulation width setting means 5d; a counter 5c which has an initial value "0" to be incremented by one whenever one pixel is processed, and which is reset to "0" while generating a gradation modulation width coincidence signal when the value of the counter 5c coincides with the value of the gradation modulation width setting means 5d; buffer width setting means 5e; a counter 5f which has an initial value "0" to be incremented by one whenever one pixel is processed and which is reset to "0" while generating a buffer width coincidence signal when the value of the counter 5f coincides with the value of the buffer width setting means 5e; start address setting means 5g for setting, by the CPU, the value of a start address; and address control means 5h for performing address control by use of the values of the start address setting means 5g, the raster offset 5b and the counters 5c and 5f to generate addresses 1 and 2.

Incidentally, the width of the bit map input data is set by the aforementioned width setting means.

When Sadrs, Roff, Adrs1 and Adrs2 are the value of the start address, the value of the raster offset, the value of address 1 and the value of address 2 respectively, the address control means 5h generates values given by the following four expressions (4) to (7):

$$Adrs1 = Abase0 \quad (4)$$

$$Adrs2 = Abase0 + Roff \quad (5)$$

$$Abase0 = Sadrs + Abase1 \quad (6)$$

$$Abase1 = Abase2 + Abase3 \quad (7)$$

In the expression (7), Abase3 is the value of a counter which has an initial value "0" to be incremented by one whenever the gradation modulation width coincidence signal is generated and which is reset to "0" when the buffer width coincidence signal is generated, and Abase2 is the value of a counter which has an initial value "0" to be incremented by Roff for the set rotation angle of 0° or 180° or by 2×Roff for the set rotation angle of 90° or 270° whenever the buffer width coincidence signal is generated.

The buffer means 4 will be described with reference to FIG. 6.

The buffer means 4 is constituted by: rotation angle setting means 4a for setting, by the CPU, four kinds of rotation angles 0°, 90°, 180° and 270° clockwise; buffers 4b and 4c each of which has a 32-bit width and in which gradation-modulated data 1 and 2 are stored for the set rotation angle of 90° or 270° respectively whenever one pixel is processed; and buffer write control means 4d for generating an address, data and a write control signal by use of the gradation-modulated data 1 and 2 output from the gradation modulating means 2, the addresses 1 and 2 output from the addressing means 5 and the rotation angle set by the rotation angle setting means 4a. The buffer means 4 performs writing of gradation-modulated data into the storage means 6. Incidentally, when the set rotation angle is 0° or 270°, the gradation-modulated data 1 and 2 are written only in the buffer 4b in this order whenever one pixel is processed.

Upon reception of 32-bit data of the same size as the buffer size, each of the buffers 4b and 4c issues a write request to the buffer write control means 4d. Upon reception of the write request from the buffer 4b or 4c, the buffer write control means 4d generates an address, data and a write control signal to store the gradation-modulated data into the storage means 6 by use of address 1 and buffer data of the buffer 4b for the request from the buffer 4b or by use of address 2 and buffer data of the buffer 4c for the request from the buffer 4c.

Next, the storage means 6 will be described with reference to FIG. 7.

The storage means 6 is constituted by: a storage memory 6a for storing data; gradation-modulated rotated output control means 6b for sending out a read control signal to read the gradation-modulated rotated data from the storage memory 6a to thereby send out a bit map gradation-modulated rotated output upon reception of an output instruction from the CPU; and a memory controller 6c for controlling writing/reading of data into/from the storage memory 6a in response to the reception of the write control signal from the buffer means 4, the read/write control signal from the rotating means 7 and the read control signal from the gradation-modulated rotated output control means 6b.

Next, the rotating means 7 will be described with reference to FIG. 8.

The rotating means 7 is constituted by: rotation angle setting means 7a for setting, by the CPU, four kinds of rotation angles 0°, 90°, 180° and 270° clockwise; write control means 7b for performing write control on the basis of the write control signal, address and data; read control means 7c for performing read control on the basis of the read control signal, address and data; shift control means 7d for performing shift control; and a register 7e with a size of 32×32. The rotating means 7 rotates two-valued data of 32×32 bits.

FIG. 9 shows the contents of the register 7e. In FIG. 9, R expresses rows and C expresses columns. That is, Ri expresses 32-bit register data in the i-th row on columns C0 to C31, and Ci expresses 32-bit register data in the i-th column on rows R0 to R31.

The read control means 7c controls the shift control means 7d to perform a shift operation of Ri=R (i+1) so that the 32-bit data read from the storage means 6 is written into R31.

Upon completion of writing of 32-bit data by 32 times, the write control means 7b reads 32-bit data from the register 7e in accordance with the setting of the rotation register and controls the shift control means 7d to perform a shift operation while controlling writing of data into the storage memory 6a. When, for example, the set rotation angle is 90°, the write control means 7b reads 32-bit data of C0 from the register 7e, inverts the arrangement of bits of from MSB to LSB, controls writing of data into the storage memory 6a and controls the shift control means 7d to perform a shift operation of Ci=C (i+1). When, for example, the set rotation angle is 180°, the write control means 7b reads 32-bit data of R31 from the register 7e, inverts the arrangement of bits from MSB to LSB, controls writing of data into the storage memory 6a and controls the shift control means 7d to perform a shift operation of Ri=R (i−1). When, for example, the set rotation angle is 270°, the write control means 7b reads 32-bit data of C31 from the register 7e, controls writing of data into the storage memory 6a and controls the shift control means 7d to perform a shift operation of Ci=C (i−1).

After this reading operation is carried out by 32 times, the operation of rotating data of 32×32 bits is terminated.

As described above, in the image processing system 1 according to this embodiment, gradation modulation and rotation of bit map data can be performed at a high speed in spite of a small memory capacity because gradation modulation is first performed by the gradation modulating means 2 and the gradation-modulated output data of pixels are stored in a plurality of buffers in the buffer means 4 so that rotation is performed by the rotating means 7 after the data of the buffers are stored in addresses designated by the addressing means 5.

Embodiment 2

Figure 10:
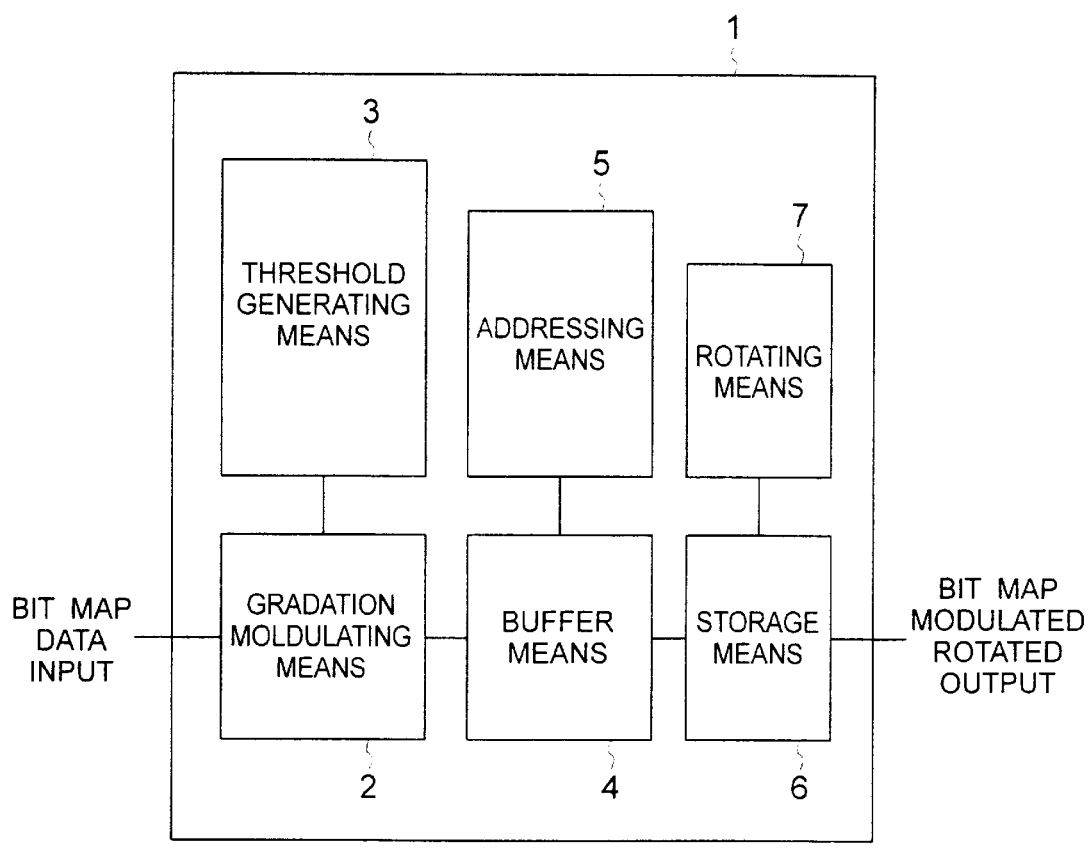
FIG. 10 is a block diagram showing an image processing system according to Embodiment 2 of the present invention.
Figure 11:
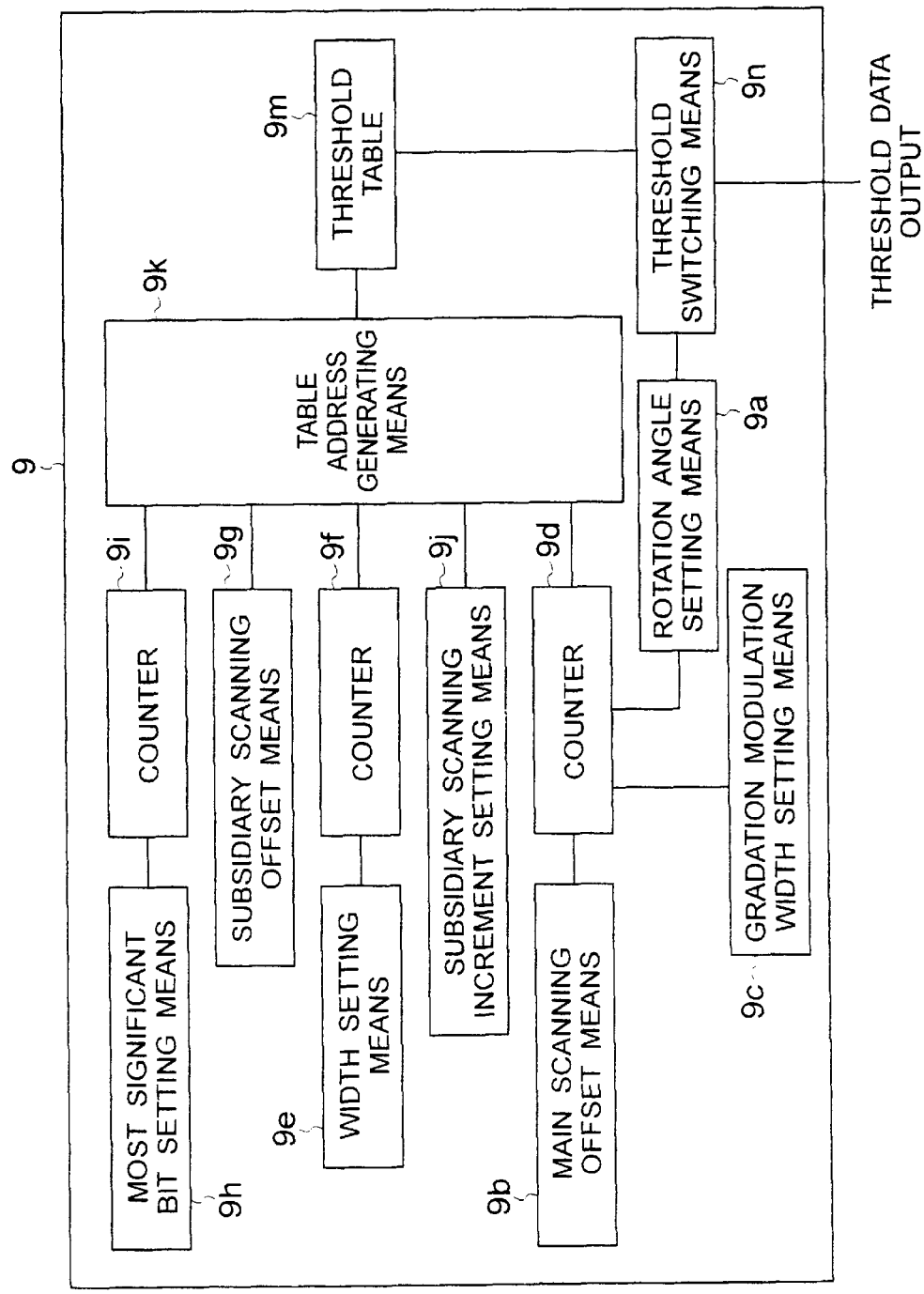
FIG. 11 is a block diagram showing threshold generating means in the image processing system depicted in FIG. 10.
Figures 12, 13:
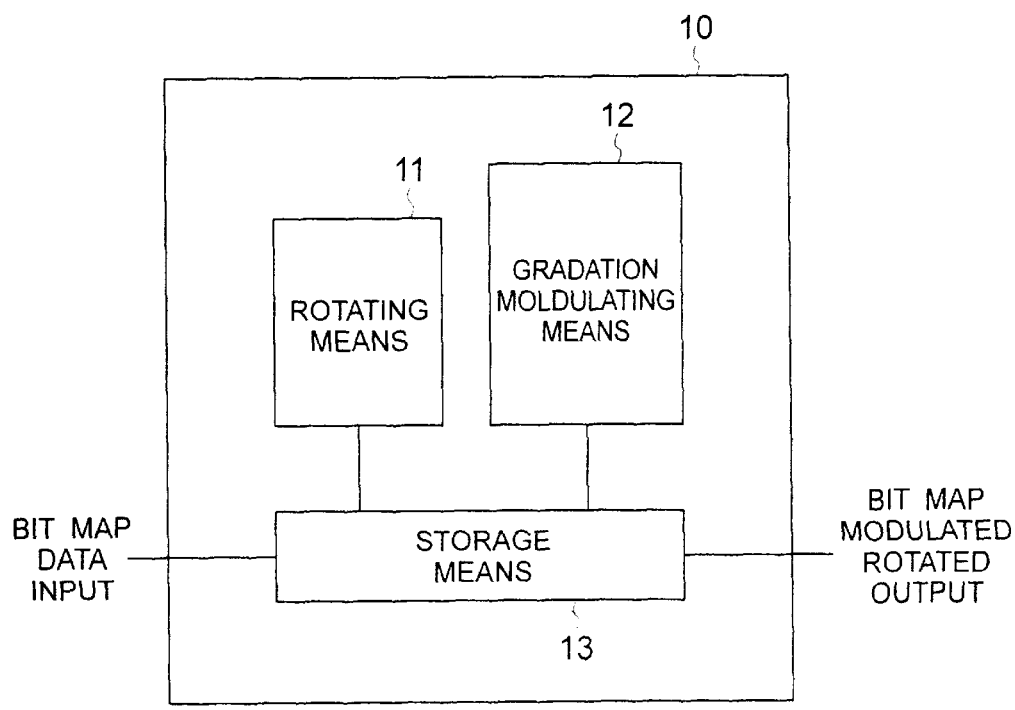
FIG. 12 is an explanatory view showing table data in the threshold generating means depicted in FIG. 11.
FIG. 13 is a block diagram showing a background-art image processing system.

FIG. 10 is a block diagram showing an image processing system according to Embodiment 2 of the present invention; FIG. 11 is a block diagram which shows threshold generating means in the image processing system depicted in FIG. 10; and FIG. 12 is an explanatory view which shows table data in the threshold generating means depicted in FIG. 11. Incidentally, the gradation modulating means, the addressing means, the buffer means, the storage means and the rotating means described in Embodiment 1 with reference to FIGS. 4 through 9 are applied to this embodiment.

As shown in FIG. 10, the image processing system according to Embodiment 2 is provided with: threshold generating means 9 for generating a threshold while controlling generation of a threshold reference table address in accordance with the rotation angle for bit map data having the attribute of rotation; gradation modulating means 2 for performing gradation modulation by use of the threshold generated by the threshold generating means 9 to thereby obtain gradation-modulated data; buffer means 4 for storing the gradation-modulated data from the gradation modulating means 2 into a plurality of buffers; addressing means 5 for designating respective storage addresses for the plurality of buffers of the buffer means 4; rotating means 7 for rotating the gradation-modulated data; and storage means 6 for storing the contents of the buffer means 4 into the addresses designated by the addressing means 5 and, at the same time, outputting the gradation-modulated data rotated by the rotating means 7.

According to such an image processing system 8, the threshold generated by the threshold generating means 9 and bit map data are used for obtaining two-valued gradation-modulated data in the gradation modulating means 2. The gradation-modulated data is stored in the buffer means 4. The contents of the buffer means 4 are stored into the storage means 6 by use of the addresses generated by the addressing means 5. The gradation-modulated data stored in the storage means 6 is rotated by the rotating means 7 and then stored into the storage means 6 again. The data thus obtained is taken out as a bit map gradation-modulated rotated output as occasion demands.

The threshold generating means 9 will be described with reference to FIG. 11.

The threshold generating means 9 is constituted by: rotation angle setting means 9a for setting, by the CPU, four kinds of rotation angles 0°, 90°, 180° and 270° clockwise; main scanning offset means 9b; gradation modulation width setting means 9c for setting, by the CPU, the width in the direction of main scanning of gradation modulation tables; a counter 9d for loading the main scanning offset means 9b so that the value of the counter 9d is incremented by one for the set rotation angle of 0° or 270° or decremented by one for the set rotation angle of 90° or 180° whenever one pixel of the data input is processed, and for reloading the main scanning offset means 9b while generating a gradation modulation width coincidence signal when the value of the counter 9d coincides with the value of the gradation modulation width setting means 9c; width setting means 9e for setting, by the CPU, the image width of an input image; a counter 9f which has an initial value "0" to be incremented by one whenever one pixel of the data input is processed and which is reset to "0" while generating a width coincidence signal when the value of the counter 9f coincides with the value of the width setting means 9e; subsidiary scanning offset 9g for setting, by the CPU, the offset value in the direction of subsidiary scanning of gradation modulation tables; most significant bit setting means 9h for setting by, the CPU, the most significant bit to "1" or "0"; a counter 9i, which is one-bit counter, for loading the value of the most significant bit setting means 9h into its initial value to be incremented by one whenever one pixel is processed and for reloading the value of the most significant bit setting means 9h in response to the gradation modulation width coincidence signal; subsidiary scanning increment setting means 9j for setting the value of subsidiary scanning increment; table address generating means 9k for generating a table address; a threshold table 9m supplied with the table address generated by the table address generating means 9k; and threshold switching means 9n for selecting predetermined one threshold data on the threshold table 9m in accordance with the contents of the rotation angle setting means 9a.

When Soff, Dinc and Cnt5 are the value of the subsidiary scanning offset means 9g, the value of the subsidiary scanning increment setting means 9j and the value of the counter 9d respectively, the table address Dadrs generated by the table address generating means 9k is given by the expression (8):

$$Dadrs=Dbase+Cnt5 \qquad (8)$$

in which Dbase is a value initially set as follows:

$$Dbase=Soff \qquad (9)$$

and updated upon the reception of the width coincidence signal as follows:

$$Dbase=Dbase+Dinc \qquad (10)$$

The table address Dadrs thus obtained is supplied directly to the threshold table 9m when the set rotation angle is 0° or 180°. When the set rotation angle is 90° or 270°, the table address Dadrs is supplied to the threshold table 9m after the most significant bit of Dadrs is replaced by the value of the counter 9i.

The threshold table 9m is configured as shown in FIG. 12. In FIG. 12, the first column expresses addresses and the second and third columns express table data. The second column of data is threshold data 1 and the third column of data is threshold data 2.

When the set rotation angle is 0° or 270°, the threshold switching means 9n outputs the threshold data 1 and 2 directly as threshold data. When the set rotation angle is 90° or 180°, the threshold switching means 9n exchanges the contents of the threshold data 1 and 2 output from the threshold table 9m into each other and then outputs the exchanged data as threshold data.

As shown in FIG. 4, the gradation modulating means 2 is constituted by comparators 2a and 2b for comparing bit map input data with the threshold data 1 and 2 respectively. The threshold data 1 and 2 are threshold data generated by the threshold generating means 9. Gradation-modulated data 1 and 2 which are two-valued gradation-modulated data are outputted on the basis of the results of comparison of the comparators 2a and 2b respectively. Incidentally, each of the gradation-modulated data 1 and 2 takes "1" for Vb>Th and "0" for Vb≦Th when Vb is the value of the bit map input data and Th is the value of the corresponding threshold data.

As shown in FIG. 5, the addressing means 5 is constituted by: rotation angle setting means 5a for setting, by the CPU, four kinds of rotation angles 0°, 90°, 180° and 270° clockwise; a raster offset 5b for setting the address offset for gradation-modulated output data corresponding to the pixel width of bit map input data; gradation modulation width setting means 5d; a counter 5c which has an initial value "0" to be incremented by one whenever one pixel is processed and which is reset to "0" while generating a gradation modulation width coincidence signal when the value of the counter 5c coincides with the value of the gradation modulation width setting means 5d; buffer width setting means 5e; a counter 5f which has an initial value "0" to be incremented by one whenever one pixel is processed and which is reset to "0" while generating a buffer width coincidence signal when the value of the counter 5f coincides with the value of the buffer width setting means 5e; start address setting means 5g for setting, by the CPU, the value of a start address; and address control means 5h for performing address control by use of the values of the start address setting means 5g, the raster offset 5b and the counters 5c and 5f to generate addresses 1 and 2.

Incidentally, the width of the bit map input data is set by the aforementioned width setting means.

When Sadrs, Roff, Adrs1 and Adrs2 are the value of the start address, the value of the raster offset, the value of address 1 and the value of address 2 respectively, the address control means 5h generates values given by the aforementioned four expressions (4) to (7).

In the expression (7), Abase3 is the value of a counter which has an initial value "0" to be incremented by one whenever the gradation modulation width coincidence signal is generated and which is reset to "0" when the buffer width coincidence signal is generated, and Abase2 is the value of a counter which has an initial value "0" to be incremented by Roff for the set rotation angle of 0° or 180° or by 2×Roff for the set rotation angle of 90° or 270° whenever the buffer width coincidence signal is generated.

As shown in FIG. 6, the buffer means 4 is constituted by: rotation angle setting means 4a for setting, by the CPU, four kinds of rotation angles 0°, 90°, 180° and 270° clockwise; buffers 4b and 4c each of which has a 32-bit width and in which gradation-modulated data 1 and 2 are stored for the set rotation angle of 90° or 270° whenever one pixel is processed; and buffer write control means 4d for generating an address, data and a write control signal by use of the gradation-modulated data 1 and 2 outputted from the gradation modulating means 2, the addresses 1 and 2 outputted from the addressing means 5 and the rotation angle set by the rotation angle setting means 4a. The buffer means 4 performs writing of gradation-modulated data into the storage means 6. Incidentally, when the set rotation angle is 0° or 270°, the gradation-modulated data 1 and 2 are written only in the buffer 4b in this order whenever one pixel is processed.

Upon reception of 32-bit data of the same size as the buffer size, each of the buffers 4b and 4c issues a write request to the buffer write control means 4d. Upon reception of the write request from the buffer 4b or 4c, the buffer write control means 4d generates an address, data and a write control signal to store the gradation-modulated data into the storage means 6 by use of address 1 and buffer data of the buffer 4b for the request from the buffer 4b or by use of address 2 and buffer data of the buffer 4c for the request from the buffer 4c.

As shown in FIG. 7, the storage means 6 is constituted by: a storage memory 6a for storing data; gradation-modulated rotated output control means 6b for sending out a read control signal to read the gradation-modulated rotated data from the storage memory 6a to thereby send out a bit map gradation-modulated rotated output upon reception of an output instruction from the CPU; and a memory controller 6c for controlling writing/reading of data into/from the storage memory 6a in response to the reception of the write control signal from the buffer means 4, the read/write control signal from the rotating means 7 and the read control signal from the gradation-modulated rotated output control means 6b.

As shown in FIG. 8, the rotating means 7 is constituted by: rotation angle setting means 7a for setting, by the CPU, four kinds of rotation angles 0°, 90°, 180° and 270° clockwise; write control means 7b for performing write control on the basis of the write control signal, address and data; read control means 7c for performing read control on the basis of the read control signal, address and data; shift control means 7d for performing shift control; and a register 7e with a size of 32×32. The rotating means 7 rotates two-valued data of 32×32 bits.

In FIG. 9, R expresses rows and C expresses columns. That is, Ri expresses 32-bit register data in the $i^{th}$ row on columns C0 to C31, and Ci expresses 32-bit register data in the $i^{th}$ column on rows R0 to R31.

The read control means 7c controls the shift control means 7d to perform a shift operation of Ri=R (i+1) so that the 32-bit data read from the storage means 6 is written into R31.

Upon completion of writing of 32-bit data by 32 times, the write control means 7b reads 32-bit data from the register 7e in accordance with the setting of the rotation register and controls the shift control means 7d to perform a shift operation while controlling writing of data into the storage memory 6a. When, for example, the set rotation angle is 90°, the write control means 7b reads 32-bit data of C0 from the register 7e, inverts the arrangement of bits from MSB to LSB, controls writing of data into the storage memory 6a and controls the shift control means 7d to perform a shift operation of Ci=C (i+1). When, for example, the set rotation angle is 180°, the write control means 7b reads 32-bit data of R31 from the register 7e, inverts the arrangement of bits from MSB to LSB, controls writing of data into the storage memory 6a and controls the shift control means 7d to perform a shift operation of Ri=R (i−1). When, for example, the set rotation angle is 270°, the write control means 7b reads 32-bit data of C31 from the register 7e, controls writing of data into the storage memory 6a and controls the shift control means 7d to perform a shift operation of Ci=C (i−1).

After this reading operation is carried out by 32 times, the operation of rotating data of 32×32 bits is terminated.

As described above, in the image processing system 8 according to Embodiment 2, gradation modulation and rotation of bit map data can be performed at a high speed in spite of a small memory capacity because gradation modulation is first performed by the gradation modulating means 2 and the gradation-modulated output data of pixels are stored in a plurality of buffers in the buffer means 4 so that rotation is performed by the rotating means 7 after the data of the buffers are stored in addresses designated by the addressing means 5.

Moreover, gradation modulation and rotation may be achieved by use of only one threshold reference table.

As described above, according to the present invention, a useful effect that gradation modulation and rotation of bit map data can be performed at a high speed in spite of a small memory capacity is obtained because gradation modulation is first performed by the gradation modulating means and the gradation-modulated output data of pixels are stored in a plurality of buffers in the buffer means so that rotation is performed by the rotating means after the data of the buffers are stored in addresses designated by the addressing means.

Also a useful effect that gradation modulation and rotation can be achieved by use of only one threshold reference table is obtained because the threshold generating means is used.

What is claimed is:

1. An image processing system comprising:
   threshold table selecting means for selecting one of a plurality of threshold reference tables in accordance with an angle of rotation for bit map data having an attribute of rotation to thereby generate a threshold;
   gradation modulating means for performing gradation modulation by use of said threshold generated by said threshold table selecting means to thereby obtain gradation-modulated data;
   buffer means having a plurality of buffers and for storing said gradation-modulated data of said gradation modulating means into said plurality of buffers;
   addressing means for designating respective storage addresses for the plurality of buffers of said buffer means;
   rotating means for rotating said gradation-modulated data; and
   storage means for storing contents of said buffer means into said addresses designated by said addressing means and outputting said gradation-modulated data rotated by said rotating means.

2. An image processing system according to claim 1, wherein said threshold table selecting means includes:
   rotation angle setting means for setting a plurality of rotation angles;
   table address generating means for generating a table address;
   a plurality of gradation modulation tables supplied with said table address generated by said table address generating means; and
   threshold data selecting means for selecting threshold data from said gradation modulation tables in accordance with a rotation angle set by said rotation angle setting means to thereby output first and second threshold data.

3. An image processing system according to claim 1, wherein said gradation modulating means includes first and second comparators, said first comparator having first and second inputs, said second comparator having first and second inputs, said first input of said first comparator being provided to receive first threshold data from said threshold data selecting means, said first input of said second comparator being provided to receive second threshold data from said threshold data selecting means, each of said second inputs of said first and second comparators being provided to receive said bit map data.

4. An image processing system according to claim 1, wherein said buffer means includes first and second buffers, and buffer write control means, each of said first and second buffers being provided to receive gradation-modulated data from said gradation modulating means, said buffer write control means being provided to receive an address from said addressing means.

5. An image processing system according to claim 1, wherein said storage means includes a storage memory for storing data, a memory controller for receiving a write control signal from said buffer means and a read control signal from said rotating means, and output control means for reading gradation-modulated data from said storage memory and outputting the gradation-modulated data.

6. An image processing system comprising:
   threshold generating means for generating a threshold while controlling generation of a threshold reference table address in accordance with an angle of rotation for bit map data having an attribute of rotation;
   gradation modulating means for performing gradation modulation by use of said threshold generated by said threshold generating means to thereby obtain gradation-modulated data;
   buffer means having a plurality of buffers and for storing said gradation-modulated data obtained by said gradation modulating means into said plurality of buffers;
   addressing means for designating respective storage addresses for the plurality of buffers of said buffer means;
   rotating means for rotating said gradation-modulated data; and
   storage means for storing contents of said buffer means into said addresses designated by said addressing means and outputting said gradation-modulated data rotated by said rotating means.

7. An image processing system according to claim 2, wherein said threshold generating means includes:
   rotation angle setting means for setting a plurality of rotation angles;
   table address generating means for generating a table address;
   a threshold table supplied with said table address generated by said table address generating means; and
   threshold switching means for outputting predetermined threshold data from threshold data on said threshold table in accordance with a rotation angle set by said rotation angle setting means.

8. An image processing system according to claim 6, wherein said gradation modulating means includes first and second comparators, said first comparator having first and second inputs, said second comparator having first and second inputs, said first input of said first comparator being provided to receive first threshold data from said threshold data selecting means, said first input of said second comparator being provided to receive second threshold data from said threshold data selecting means, each of said second inputs of said first and second comparators being provided to receive said bit map data.

9. An image processing system according to claim 6, wherein said buffer means includes first and second buffers, and buffer write control means, each of said first and second buffers being provided to receive gradation-modulated data from said gradation modulating means, said buffer write control means being provided to receive an address from said addressing means.

10. An image processing system according to claim 6, wherein said storage means includes a storage memory for storing data, a memory controller for receiving a write control signal from said buffer means and a read control signal from said rotating means, and output control means for reading gradation-modulated data from said storage memory and outputting the gradation-modulated data.

* * * * *